US009967610B2

(12) United States Patent
Roberts et al.

(10) Patent No.: US 9,967,610 B2
(45) Date of Patent: May 8, 2018

(54) METHODS AND SYSTEMS FOR PROVIDING CONTEXT-BASED CUSTOMER SUPPORT FOR A USER INTERFACE VIEW ASSOCIATED WITH A TELEVISION SERVICE

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 14/675,537

(22) Filed: Mar. 31, 2015

(65) Prior Publication Data

US 2016/0127788 A1    May 5, 2016

Related U.S. Application Data

(60) Provisional application No. 62/072,863, filed on Oct. 30, 2014.

(51) Int. Cl.
*G06F 3/00* (2006.01)
*G06F 13/00* (2006.01)
(Continued)

(52) U.S. Cl.
CPC ....... *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01);
(Continued)

(58) Field of Classification Search
None
See application file for complete search history.

(56) References Cited

U.S. PATENT DOCUMENTS 6,177,931 B1 *  1/2001  Alexander ......... G06Q 30/0269
                                            348/565
8,132,204 B2 *  3/2012  Haberman ........ G06F 17/30817
                                            725/138
(Continued)

*Primary Examiner* — Kunal Langhnoja

(57) ABSTRACT

An exemplary computer-implemented television service system detects, while a media content processing device is presenting a user interface view associated with a television service within a display screen in communication with the media content processing device, an input command provided by a user of the media content processing device and representative of a request for customer support. In response, the system identifies a context within which the input command is provided by the user, selects, based on the identified context, customer support content provided by the television service and associated with the user interface view being presented within the display screen, and directs the media content processing device to present the customer support content within the user interface view. Corresponding systems and methods are also described.

17 Claims, 10 Drawing Sheets

(51) Int. Cl.
  *H04N 5/445* (2011.01)
  *H04N 21/431* (2011.01)
  *H04N 21/45* (2011.01)
  *H04N 21/466* (2011.01)
  *H04N 21/442* (2011.01)
  *H04N 21/462* (2011.01)
  *H04N 21/4725* (2011.01)
  *H04N 21/475* (2011.01)
  *H04N 21/482* (2011.01)
  *H04N 21/81* (2011.01)
  *G06F 3/0482* (2013.01)
  *H04N 21/472* (2011.01)
  *H04N 21/4788* (2011.01)
  *H04N 21/458* (2011.01)
  *H04N 21/25* (2011.01)
  *H04N 21/258* (2011.01)
  *H04N 21/658* (2011.01)

(52) U.S. Cl.
  CPC ... *H04N 21/4788* (2013.01); *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

(56) References Cited

U.S. PATENT DOCUMENTS

2002/0188960 A1* 12/2002 Rodriguez ......... H04N 5/44543 725/120
2008/0229362 A1*  9/2008 White ............... H04N 5/44543 725/47
2012/0166945 A1*  6/2012 Roberts ............. H04N 21/4126 715/708

* cited by examiner

METHODS AND SYSTEMS FOR PROVIDING CONTEXT-BASED CUSTOMER SUPPORT FOR A USER INTERFACE VIEW ASSOCIATED WITH A TELEVISION SERVICE

RELATED APPLICATIONS

The present application claims priority under 35 U.S.C. § 119(e) to U.S. Provisional Patent Application No. 62/072,863, filed Oct. 30, 2014. The contents of the provisional patent application are hereby incorporated by reference in their entirety.

BACKGROUND INFORMATION

Many television services (e.g., subscription-based fiber television services, satellite television services, and cable television services) offer a plethora of features, such as menus, interactive program guides, video-on-demand libraries, recording options, and others. Some users may have difficulty using and/or accessing some of these features. Hence, some television services provide on-screen customer support (e.g., in the form of instructions, tutorials, etc.) that teach users how to access and use various features that the television services provide.

Unfortunately, it may be difficult for a user to access and/or interact with conventional customer support provided by a television service. For example, a user may have to navigate away from a user interface view that the user needs help with in order to access the customer support. This may make it difficult for the user to remember how to implement what the customer support teaches when the user navigates back to the user interface view. Moreover, the same customer support for a particular feature is provided to each user, regardless of the users' differing levels of understanding. This may result in some less technically savvy users not understanding the customer support and other more technically savvy users finding the customer support to be too basic.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
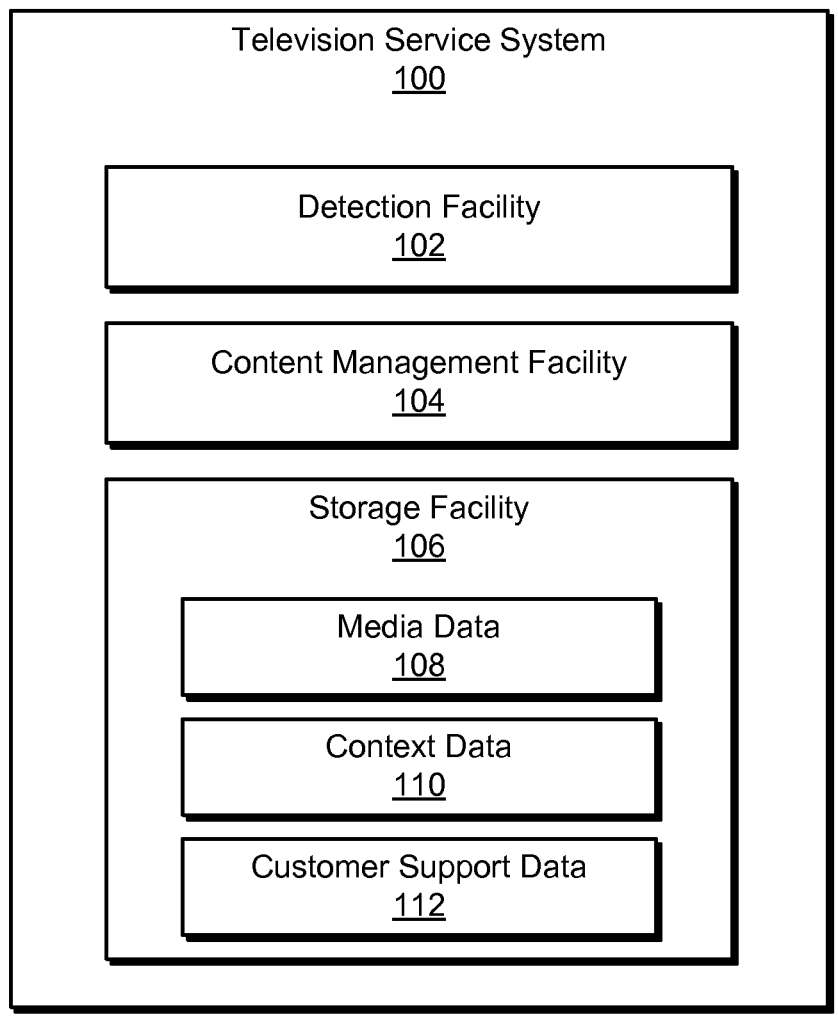
FIG. 1 illustrates an exemplary television service system according to principles described herein.

Methods and systems for providing context-based customer support for a user interface view associated with a television service are described herein. As will be described below, an exemplary computer-implemented television service system may detect, while a media content processing device is presenting a user interface view associated with a television service within a display screen in communication with the media content processing device, an input command provided by a user of the media content processing device and representative of a request for customer support. In response to the request, the television service system may identify a context within which the input command is provided by the user and select, based on the identified context, customer support content provided by the television service and associated with the user interface view being presented within the display screen. The television service system may direct the media content processing device to present the customer support content within the user interface view.

As used herein, a "context" may refer to an on-screen context, a temporal context, and/or a user context within which a user input command representative of a request for customer support is provided by a user of a media content processing device.

An "on-screen context" may indicate content (e.g., one or more features, graphical objects, etc.) displayed within the user interface view when the input command is provided by the user. For example, an on-screen context may indicate that an option to record a media program is being displayed within the user interface view when the input command is provided by the user.

A "temporal context" is representative of temporal information associated with when the input command is provided by the user. For example, a temporal context may indicate a time of day that the input command is provided by the user, a week day (e.g., Sunday, Monday, Tuesday, etc.) during which the input command is provided by the user, and/or a calendar date (e.g., March 25, April 6, etc.) during which the input command is provided by the user.

A "user context" is representative of information associated with one or more users that utilize a media content processing device in order to access media content. For example, a user context may indicate an identity of the user that provides the input command and/or a user present within a vicinity of the display screen when the input command is provided. A user context may additionally or alternatively indicate a user account that is currently logged in to the media content processing device and/or the television service when the input command is provided by the user.

As an example of the methods and systems described herein, a user may access a menu provided by a television service and displayed by a set-top box device by way of a television connected to the set-top box device. The user may not know how to use some of the features included in the menu. As a result, the user may provide a voice command representative of a request for customer support (e.g., by saying "help" into a microphone that is a part of a remote control device that controls the set-top box device). The television service system described herein may detect the voice command, determine that the menu is being displayed on the television when the voice command is provided, and determine a context within which the voice command is provided. The television service system may then select, based on the identified context, customer support content associated with the menu and direct the set-top box device to overlay the customer support content on top of the menu displayed by way of the television. In this manner, the user may access the customer support content without having to navigate away from the menu.

The methods and systems described herein may provide contextually relevant customer support content for a user interface view associated with a television service without requiring the user to navigate away from the user interface view. Moreover, the methods and systems described herein may allow a user to more readily discover and use features provided by a television service, receive customer support that is personalized to the user, and/or otherwise benefit in ways that will be made apparent herein.

FIG. 1 illustrates an exemplary television service system 100 ("system 100") configured to provide a television service (e.g., a subscriber television service) and/or one or more features of a television service to one or more end users of the television service (e.g., one or more subscribers to the television service). The television service may include any television-based service that provides end users of the service with one or more features and/or tools configured to facilitate user discovery, access, and/or consumption of media content (e.g., subscription television content, such as media programs and/or media-on-demand content). For example, system 100 may provide one or more features of a subscription television service through which end users of the service have access to various media programs. System 100 may be associated with (e.g., operated by) a provider of the television service ("service provider") and/or any other entity as may serve a particular implementation.

As shown, system 100 may include, without limitation, a detection facility 102, a content management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store data generated and/or used by detection facility 102 and/or content management facility 104. For example, storage facility 106 may store media data 108 representative of media content that is discoverable and/or accessible through a television service. As used herein, the term "media content" may refer to any form of media that may be distributed through a television service and discovered, accessed, and/or consumed by a user of the television service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the television service. Such media programs that are made available for user consumption through a television service may be accessed and/or played back by an appropriately configured media player device for presentation to a user.

Media data 108 may represent actual content of media content and/or information about the media content. For example, media data 108 may include metadata (e.g., information about genre, cast, title, playback duration, release date, chaptering information, etc.) and/or enriched metadata (e.g., user-defined tags, ratings, etc.) for the media content.

Storage facility 106 may additionally or alternatively store context data 110 representative of or otherwise associated with various types of contexts that may be identified in accordance with the methods and systems described herein.

Storage facility 106 may additionally or alternatively store customer support data 112 representative of or otherwise associated with various instances of customer support content that may be presented to a user in accordance with the methods and systems described herein. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or content management facility 104. In certain examples, data generated by detection facility 102 and/or content management facility 104 may be stored permanently or temporarily to storage facility 106.

Detection facility 102 may detect an input command provided by a user of a media content processing device and representative of a request for customer support. As will be described below, the input command may be provided while the media content processing device is presenting a user interface view associated with a television service within a display screen in communication with the media content processing device.

Detection facility 102 may detect the input command representative of the request for customer support in any suitable manner. For example, detection facility 102 may detect the input command by detecting a selection by the user of a button of a remote control device associated with (i.e., that controls) the media content processing device. In some examples, the button is a dedicated "customer support" button that may be selected by the user at any time in order to access customer support that is contextually relevant to what is being displayed within the display screen when the button is selected.

Additionally or alternatively, detection facility 102 may detect the input command by detecting a voice command provided by the user. For example, a remote control device associated with the media content processing device may include a microphone configured to receive voice commands provided by the user. Upon receiving a voice command, the remote control device may transmit data representative of the voice command to system 100 in any suitable manner. System 100 may detect the voice command by receiving the data representative of the voice command from the remote control device and then determining that the voice command is representative of a request for customer support. Additionally or alternatively, a microphone connected to the media content processing device, a mobile computing device (e.g., a smartphone), and/or any other microphone may be used to receive the voice command provided by the user.

Content management facility 104 may perform various content management operations. For example, in response to detection facility 102 detecting an input command representative of a request for customer support while a media content processing device is presenting a user interface view associated with a television service within a display screen in communication with the media content processing device, content management facility 104 may identify a context within which the input command is provided by the user. Based on the identified context, content management facility 104 may select customer support content provided by the television service and associated with the user interface view being presented within the display screen and direct the media content processing device to present the customer support content within the user interface view. Each of these operations will be described in more detail below.

Figure 2:
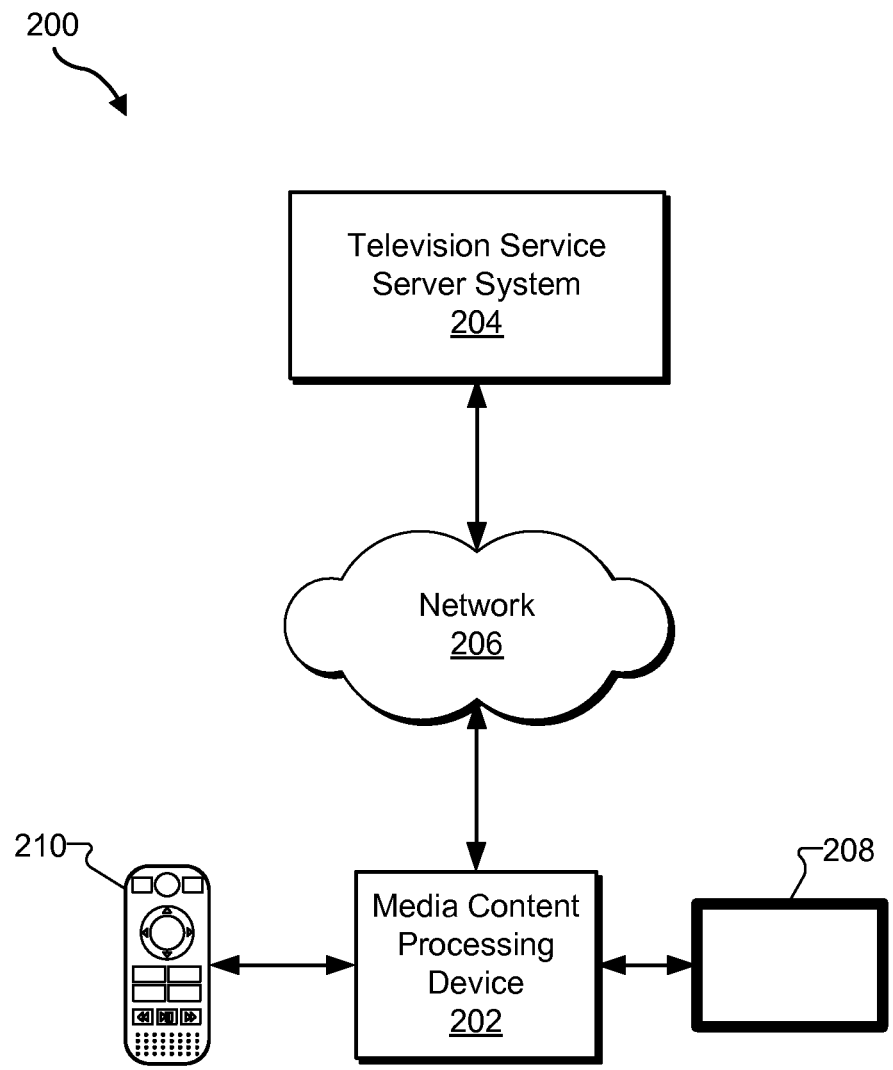
FIG. 2 shows an exemplary implementation of the system of FIG. 1 according to principles described herein.

FIG. 2 shows an exemplary implementation 200 of system 100. As shown, implementation 200 may include a media content processing device 202 in communication with a television service server system 204 ("server system 204"), which may include one or more computing devices (e.g., server devices remotely located from media content processing device 202) by way of a network 206. Implementation 200 may also include a display screen 208 and a remote control device 210 in communication with media content processing device 202.

In implementation 200, one or more of facilities 102-106 of system 100 may be implemented entirely by media content processing device 202, entirely by server system 204, or distributed across media content processing device 202, server system 204, display screen 208, and/or remote control device 210 in any manner. System 100 may alternatively be at least partially implemented by one or more computing devices or systems separate from media content processing device 202 and server system 204. For example, system 100 may be at least partially implemented by a computing system maintained by a third-party entity other than a television service provider associated with server system 204.

Media content processing device 202 and server system 204 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content processing device 202 and server system 204 may communicate via network 206. Network 206 may include one or more networks, such as one or more wireless networks (e.g., Wi-Fi networks), wireless communication networks, mobile telephone networks (e.g., cellular telephone networks), closed media networks, open media networks, wide area networks (e.g., the Internet), subscriber television networks, local area networks, and any other networks capable of carrying data (e.g., streaming and/or downloading media programs) and/ or communications signals between media content processing device 202 and server system 204. Communications between media content processing device 202 and server system 204 may be transported using any one of the above-listed networks, or any combination or sub-combination of the above-listed networks. Alternatively, media content processing device 202 and server system 204 may communicate in another way such as by direct connections between media content processing device 202 and server system 204.

Server system 204 may be configured to distribute media programs to media content processing device 202 for access and use by media content processing device 202 to present media programs for consumption by users. Server system 204 may distribute media programs to media content processing device 202 as part of the television service provided by system 100 and using any suitable media streaming and/or downloading technologies (e.g., Internet media streaming and/or downloading technologies). The television service may include a subscription television service and/or any other television service that provides access to television programming.

Media content processing device 202 may include one or more user computing devices associated with a user. Examples of such devices include, without limitation, a set-top box device, a media player computing device, a display device, a television, a digital video recording ("DVR") device, a computer, a tablet computer, a smart phone device, and any other device capable of accessing the television service and/or media programs provided by system 100.

Media content processing device 202 may be configured for use by a user associated with (e.g., operating) the media content processing device 202 to access a television service. For example, the user may utilize the media content processing device 202 to access one or more user interface views provided by server system 204 and/or media content processing device 202 as part of the television service, and to present the user interface views for use by the user to discover, access, and/or consume media programs and/or discrete installments of media programs distributed by server system 204 as part of the television service.

In some examples, media content processing device 202 may present user interface views associated with a television service by way of display screen 208. Display screen 208 may include a television, display monitor, and/or any other device separate from media content processing device 202, as shown in FIG. 2. Alternatively, display screen 208 may be integrated into media content processing device 202. For example, display screen 208 may include a display screen integrated into a tablet computer or smart phone device.

In some examples, implementation 200 may include a remote control device 210 configured to control an operation of media content processing device 202. Remote control device 210 may transmit input commands to media content processing device 202 in response to selection by a user of one or more buttons included on the remote control device 210 and/or in response to voice commands being provided by the user. In some examples, remote control device 210 may be network enabled and thereby transmit an input command representative of a request for customer support directly to server system 204 (e.g., by way of network 206).

Various manners in which system 100 may identify a context within which an input command representative of a request for customer support is provided by a user while a media content processing device is presenting a user interface view associated with a television service within a display screen in communication with the media content processing device, use the identified context to select customer support content provided by the television service and associated with the user interface view, and direct the media content processing device to present the customer support content will now be described.

In some examples, system 100 may identify the context within which the input command representative of the request for customer support is provided by the user by identifying an on-screen context within which the input command is provided by the user. As mentioned, an on-screen context may indicate or identify content displayed within the user interface view when the input command is provided by the user. For example, the on-screen context may identify one or more features, graphical objects, options, characters, etc. displayed within the user interface view when the input command is provided.

System 100 may use the identified on-screen context to select customer support content provided by the television service and associated with the user interface view being displayed within the display screen in any suitable manner. For example, system 100 may select customer support content specifically related to the content displayed within the user interface view as indicated by the on-screen context.

Figure 3:
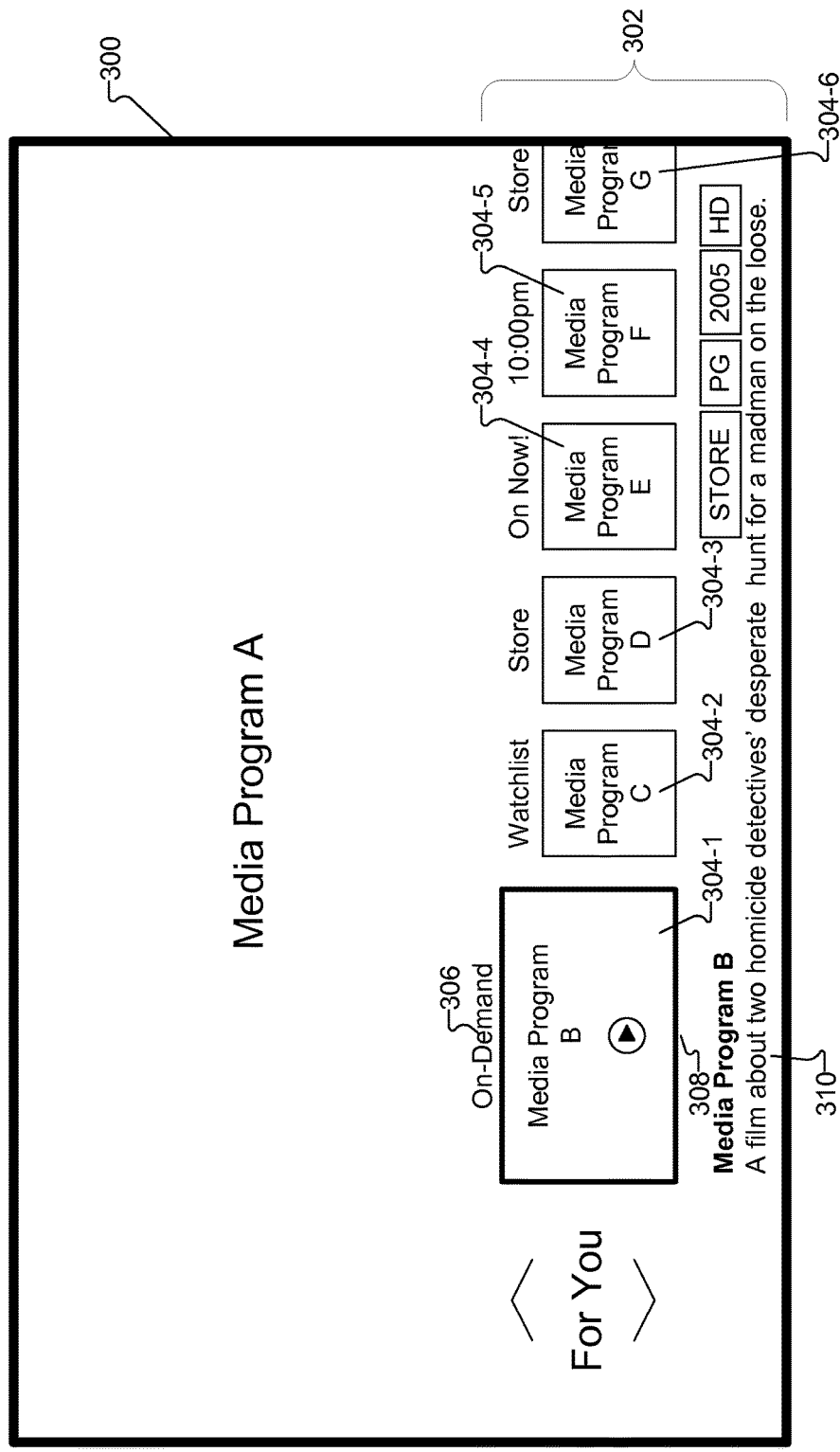
FIG. 3 shows an exemplary user interface view according to principles described herein.

To illustrate, FIG. 3 shows an exemplary user interface view 300 that may be presented by a media content processing device (e.g., media content processing device 202) within a display screen (e.g., display screen 208) in communication with the media content processing device. As shown, user interface view 300 may include a presentation of media program available by way of the television service and entitled "Media Program A". As also shown, user interface view 300 may also include a quick tray 302 representative of a set of features associated with the television service. Quick tray 302 may presented in a way that allows the media program entitled "Media Program A" to be presented in the background of user interface view 300. In this manner, the user may access the contents of quick tray 302 while still viewing the media program. Quick tray 302 may be presented in response to an input command to initiate a viewing session (e.g., when the user turns the display screen on), in response to a user input command to view the quick tray, in response to a presentation of a media program coming to an end (e.g., while closing credits for the media program are being presented), and/or at any other time as may serve a particular implementation.

As used herein, a "quick tray" may include a set of selectable graphical objects representative of a set of features associated with the television service. In the particular example of FIG. 3, quick tray 302 includes a set of graphical objects 304 (e.g., graphical objects 304-1 through 304-6) each representative of a recommended media program for the user. Each graphical object 304 may include any suitable graphic (e.g., cover art, a poster, a thumbnail image, a content rating, etc.) that represents a particular recommended media program. Each graphical object 304 may also be labeled by a badge (e.g., badge 306) that indicates a source of the recommended media program represented by the graphical object 304. In some examples, a graphical object 304 may be selected by a user in order to access (e.g., present, view information associated with, modify settings associated with, etc.) a recommended media program represented by the graphical object 304. It will be recognized that a quick tray may alternatively provide other sets of features (e.g., custom channel lineups, menu options associated with the television service, etc.).

In some examples, a user may be presented with quick tray 302 (e.g., for the first time) and not know how to use the various features included in quick tray 302. The user may accordingly provide an input command representative of a request for customer support (e.g., by selecting a button on a remote control device and/or providing a voice command). In response, system 100 may identify an on-screen context within which the user input command is provided. For example, system 100 may determine that the media program entitled "Media Program A" and quick tray 302 are being concurrently displayed within user interface view 300. In particular, system 100 may identify the various graphical objects (e.g., graphical objects 304) included in quick tray 302 at the time the input command is provided by the user.

Based on the identified on-screen context, system 100 may select contextually relevant customer support content. For example, system 100 may select customer support content related to the media program entitled "Media program A" and the various graphical objects currently displayed within user interface view 300. System 100 may then direct the media content processing device to present the selected customer support content within the user interface view 300.

Figure 4:
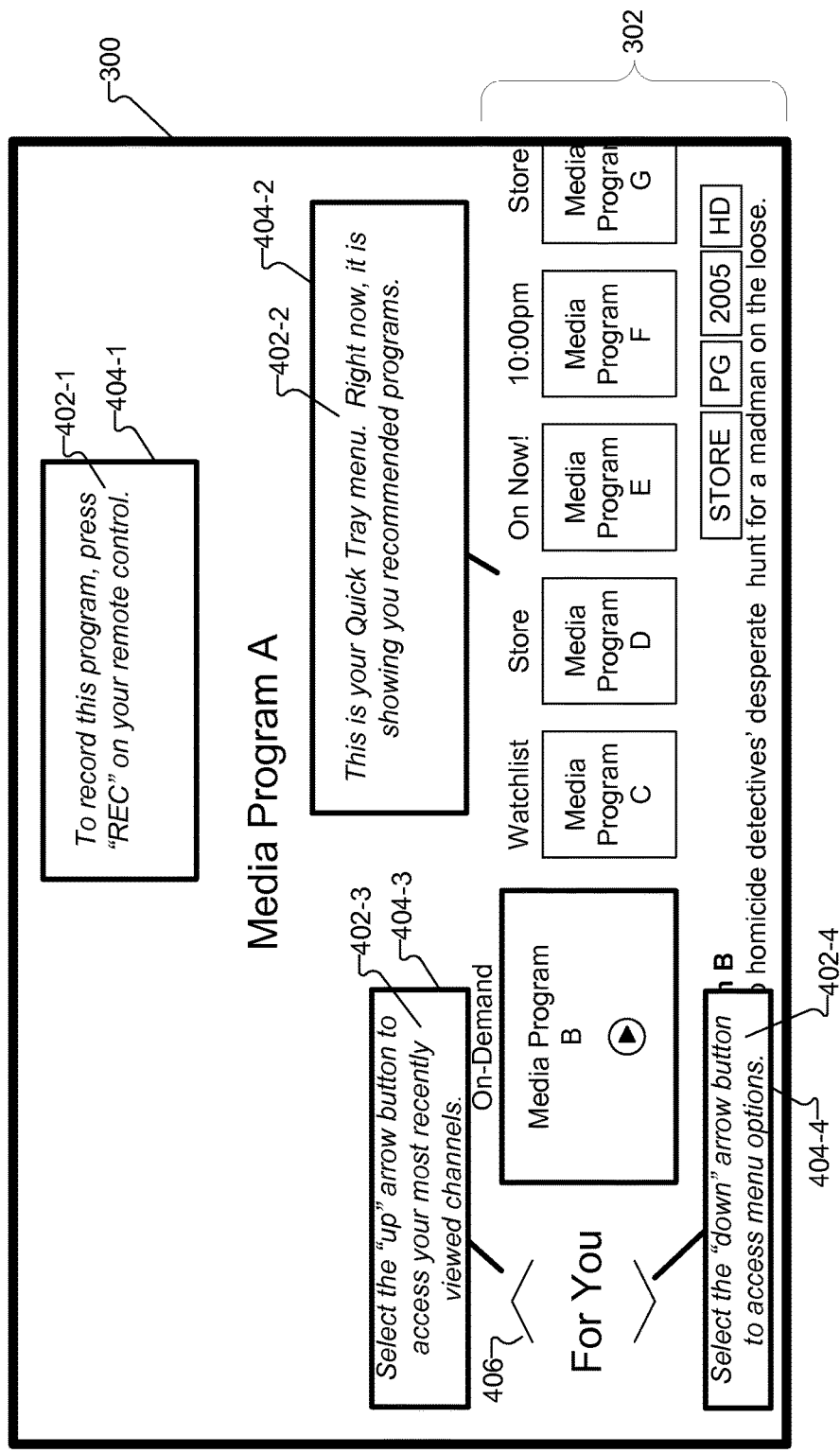
FIG. 4 shows various customer support content instances being presented within the user interface view of FIG. 3 according to principles described herein.

For example, FIG. 4 shows various customer support content instances 402 (e.g., customer support content instances 402-1 through 402-4) being presented within user interface view 300. As shown, customer support content instances 402 are displayed within user interface view 300 together with the content (i.e., the presentation of the media program entitled "Media Program A" and quick tray 302) already displayed within user interface view 300 when the input command representative of the customer support request is provided. In some examples, as shown in FIG. 4, customer support content instances 402 are overlaid on top of the content already displayed within user interface view 300 when the input command representative of the customer support request is provided. The customer support content instances 402 may be displayed alternatively within the user interface as may serve a particular implementation.

As also shown, customer support content instances 402 may each be presented within a graphical callout 404 (e.g., graphical callouts 404-1 through 404-4) that points to and/or is positioned at least partially on top of a corresponding feature and/or graphical object included in the user interface view 302. For example, customer support content instance 402-1 is presented within a graphical callout 404-1 that is positioned on top of the presentation of the media program entitled "Media Program A". As another example, customer support content instance 402-2 is presented within a graphical callout 404-2 that points to quick tray 302. It will be recognized that one or more of customer support context instances 402 and/or graphical callouts 404 may be partially transparent so that the user can still see content located behind them.

Each customer support content instance 402 may include customer support content specifically related to a feature and/or graphical object included in the user interface view 302. For example, customer support content instance 402-3 corresponds to a graphical object 406 representative of an "up" arrow 406. Hence, customer support content instance 402-3 includes a contextually relevant description of what will happen if the "up" arrow is selected given the current on-screen contents of the user interface view 300.

Additionally or alternatively, system 100 may identify the context within which the input command representative of the request for customer support is provided by the user by identifying a temporal context within which the input command is provided by the user. As mentioned, a temporal context may be representative of temporal information associated with when the input command is provide by the user.

System 100 may use the identified temporal context to select customer support content provided by the television service and associated with the user interface view being displayed within the display screen in any suitable manner. For example, system 100 may determine that the input command representative of the request for customer support is provided at a time of day during which the user typically watches a particular television program. System 100 may accordingly determine that the user is interested in receiving concise customer support content, as opposed to in-depth customer support content, so that the user may focus on viewing the television program. Based on this determination, system 100 may present the concise customer support to the user.

In contrast, system 100 may determine that the input command representative of the request for customer support is provided at a time of day during which the user typically does not watch television. In this case, system 100 may determine that the user has time to peruse in-depth customer support content and accordingly present the in-depth customer support content to the user.

System 100 may additionally or alternatively identify the context within which the input command representative of the request for customer support is provided by the user by identifying a user context within which the input command is provided by the user. In some examples, the user context indicates an identity of the user. The identity of the user may be determined by system 100 in any suitable manner.

For example, system 100 may detect that a mobile device is located within the vicinity of the media content processing device and/or display screen when the input command is provided by the user, identify a user profile associated with the mobile device, and use the user profile to determine the identity of the user.

Figure 5:
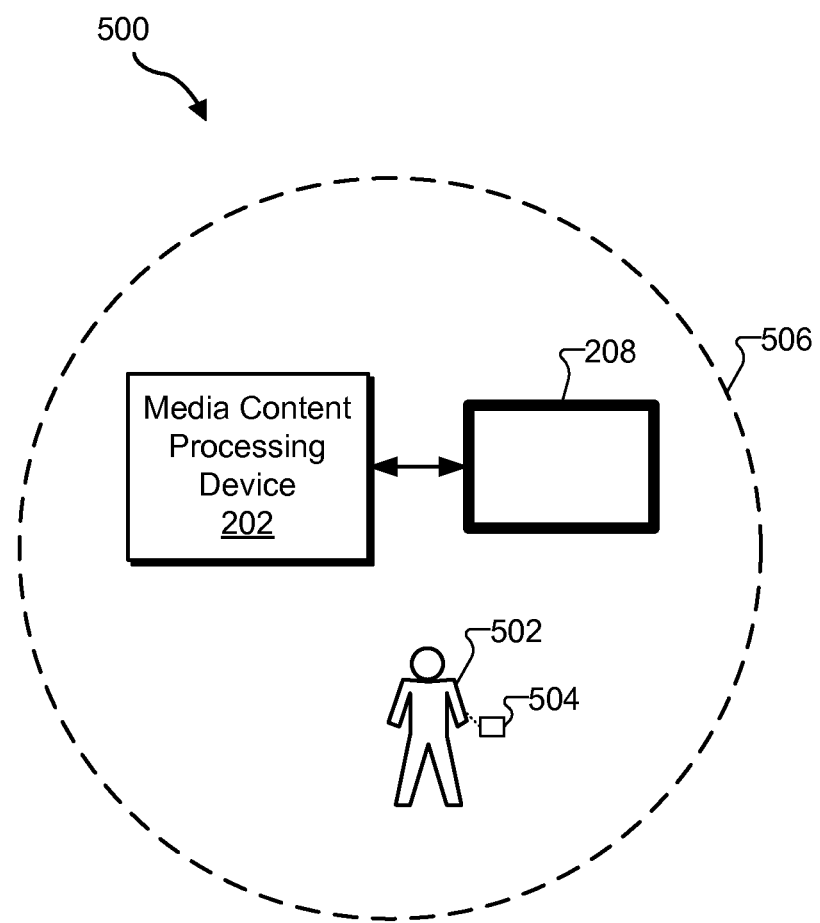
FIG. 5 illustrates an exemplary scenario in which a user carries a mobile device into a vicinity of a media content processing device and a display screen according to principles described herein.

To illustrate, FIG. 5 illustrates an exemplary scenario 500 in which a user 502 carries a mobile device 504 into a vicinity 506 of media content processing device 202 and display screen 208. Mobile device 504 may include a tablet computer, a mobile phone, and/or any other mobile computing device as may serve a particular implementation. Vicinity 506 may include a user-defined geographic area, a network footprint (e.g., a vicinity defined by a range of a wireless router), and/or any other suitable area as may serve a particular implementation. As such, system 100 may detect that mobile device 504 is within vicinity 506 in any suitable manner. For example, system 100 may use global positioning system ("GPS") data to determine that mobile device 504 is located within a geographic vicinity of media content processing device 202 and/or display screen 208. As another example, system 100 may determine that mobile device 504 is located within vicinity 506 by determining that mobile device 504 is connected to the same local area network as media content processing device 202 and/or display screen 208.

In response to determining that mobile device 504 is within vicinity 506, system 100 may identify a user profile associated with mobile device 504. This may be done in any suitable manner. For example, system 100 may detect an identifier of mobile device 504 and query a database of mobile device records (e.g., records maintained by a wireless service provider) for the identifier in order to identify a user profile associated with mobile device 504. The user profile may then be used to determine the identity of user 502 (e.g., by accessing the same mobile device records).

System 100 may additionally or alternatively determine the identity of the user by determining that the input command representative of a request for customer support is provided by way of a mobile device, identifying a user profile associated with the mobile device, and using the user profile to determine the identity of the user.

To illustrate, a user may use a remote control application on his or her mobile phone to provide an input command representative of a request for customer support. System 100 may detect that the remote control application is being used to provide the input command, and, in response, identify a user profile associated with the mobile device. For example, system 100 may identify a user account logged in to the remote control application and/or into any other application being executed by the mobile phone. The user account may then be used to determine the identity of the user.

As another example, system 100 may determine the identity of the user by acquiring biometric data associated with the user and using the biometric data to determine the identity of the user. For example, system 100 may use one or more sensors, cameras, and/or other devices to acquire facial recognition data, fingerprint data, voice recognition data, and/or any other type of biometric data associated with the user. The acquired biometric data may be used in any suitable way to determine the identity of the user.

In some examples, system 100 may determine the identity of the user by determining one or more characteristics of the user without necessarily identifying who the actual user is. For example, system 100 may determine an identity of a user by determining, in any of the ways described herein, that the user is a certain gender, age, height, etc. and use these characteristics as the identity of the user.

The user context may additionally or alternatively indicate a user account that is currently logged in to the media content processing device and/or the television service when the input command representative of a request for customer support is provided by the user. For example, when an input command representative of a request for customer support is detected, system 100 may determine that a particular user account is logged in to the television service by way of the media content processing device. System 100 may use the user account to identify the user context.

Figure 6:
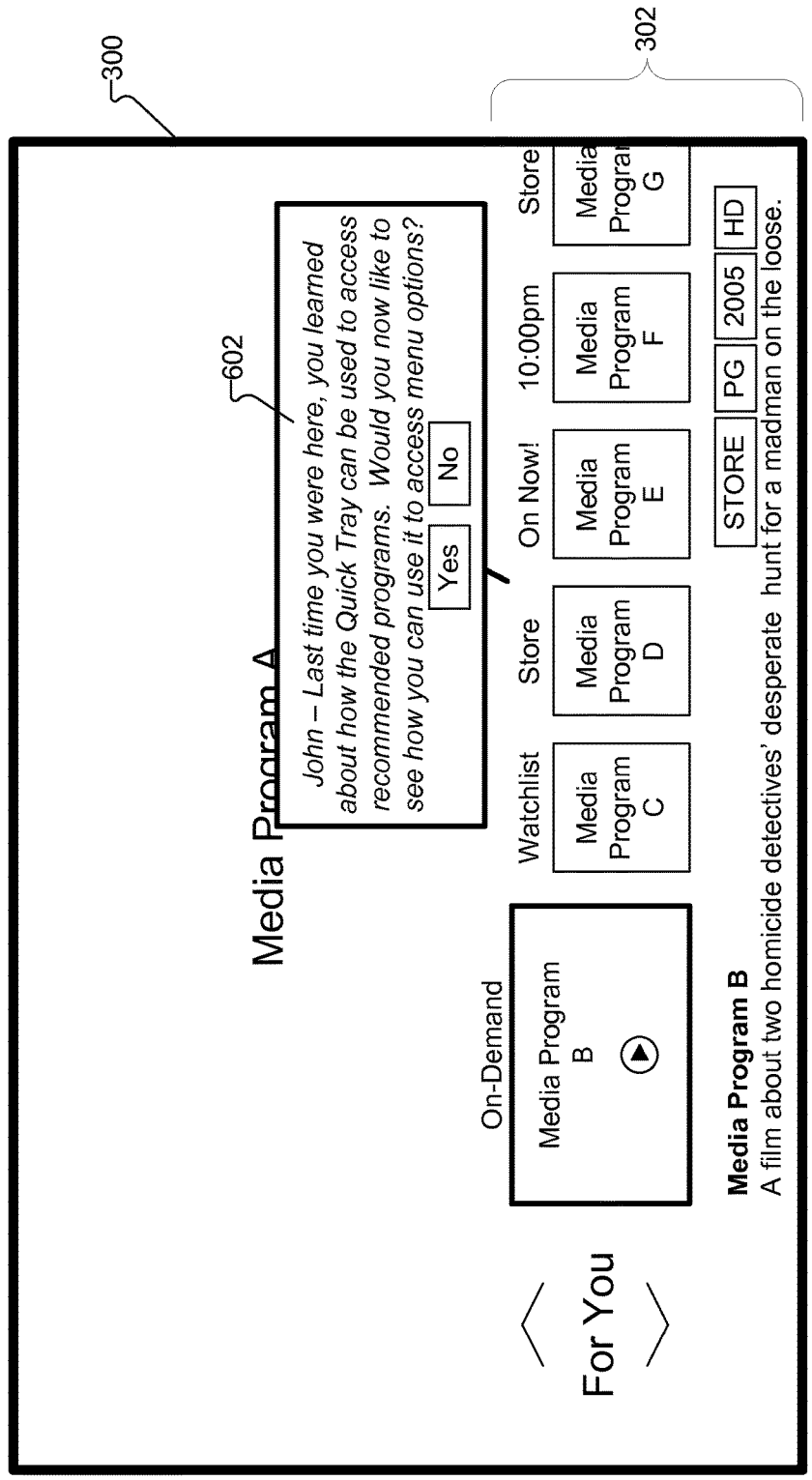
FIG. 6 shows personalized customer support content according to principles described herein.

System 100 may use the user context to select the customer support content in any suitable manner. For example, system 100 may use the user context to personalize the customer support content that is presented to the user. To illustrate, FIG. 6 shows customer support content 602 presented within user interface view 300 and that is personalized to the user viewing user interface view 300. In this example, system 100 has determined that the user who provided the input command representative of the request for customer support is named "John." The system 100 has also determined, based on the identity of the user, that the user has previously viewed customer support content associated with the quick tray 302 (e.g., by viewing customer support content instance 402-2 shown in FIG. 4). Based on this determination, as shown in FIG. 6, system 100 has personalized customer support content 602 by adding the user's name to the customer support content 602 and presenting information about a feature of the quick tray 302 that the user has not previously accessed. It will be recognized that system 100 may additionally or alternatively personalize customer support content 602 in any other suitable manner. For example, system 100 may set one or more display properties (e.g., a font, a font size, a positioning, a language, etc.) of the customer support content 602 to match one or more preferences of the user as indicated in a user profile associated with the user.

As another example, system 100 may personalize the customer support content to the user by selecting customer support content that is geared to a level of understanding or technical prowess of the user. For example, system 100 may select relatively complex and/or in-depth customer support content for presentation within a particular user interface view for a user that has a user profile that indicates that the user has a relatively high level of understanding. In contrast, system 100 may select relatively simple customer support content for presentation within the same user interface view for a user that has a relatively low level of understanding. System 100 may determine the level of understanding for a particular user in any suitable manner. For example, system 100 may base this determination on the amount of time that the user has interacted with a media content processing device, the way in which the user typically interacts with the media content processing device, the age of the user, and/or any other suitable factor as may serve a particular implementation.

System 100 may select different instances of customer support content based on a determined level of understanding for a user in any suitable manner. For example, system 100 may maintain data representative of a table that associates different levels of understanding with different customer support content instances. System 100 may accordingly use the table to select a particular customer support content instance to present to a user based on his or her level of understanding.

Figure 7:
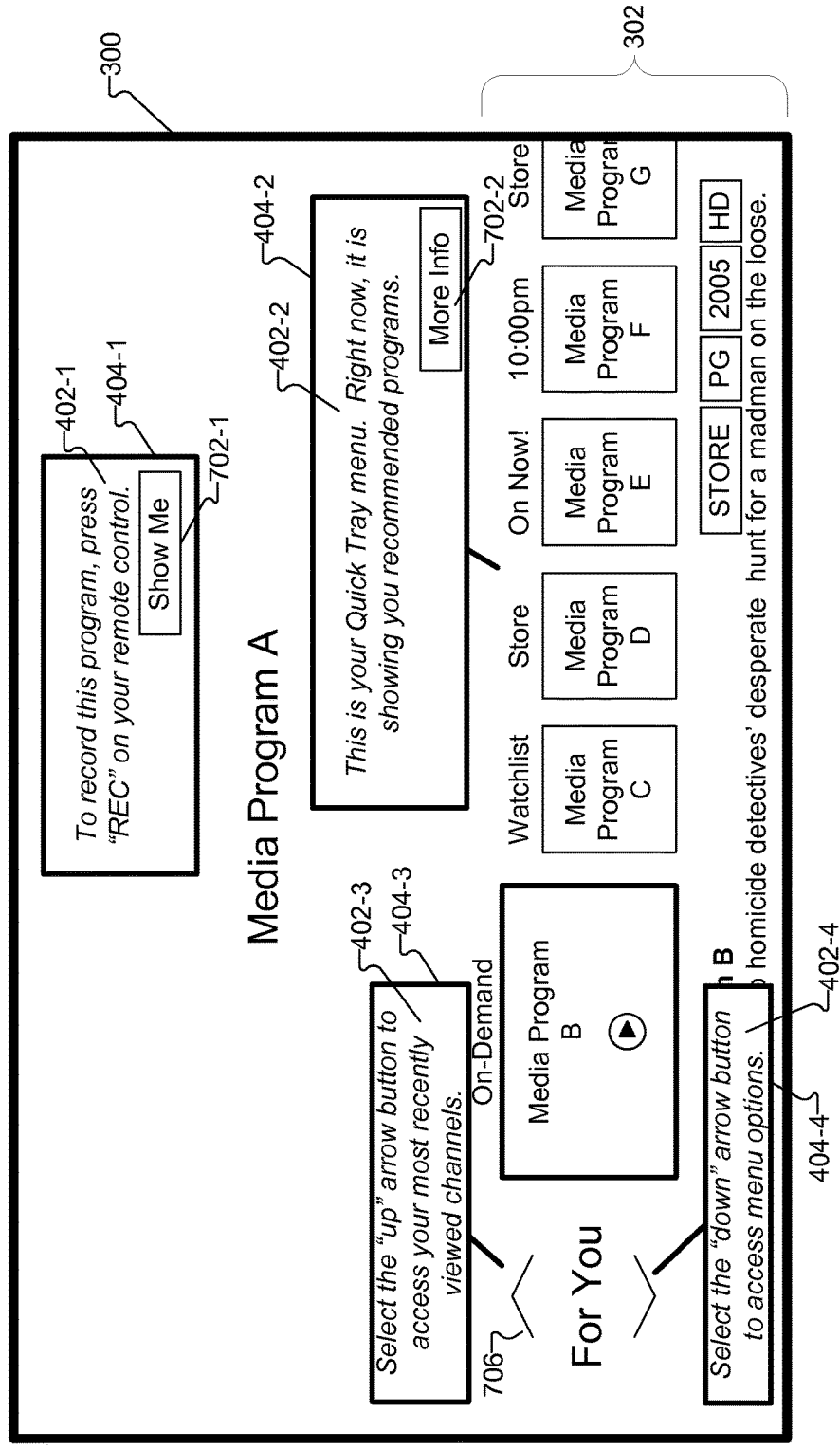
FIG. 7 shows customer support content that includes selectable options according to principles described herein.

Various types of customer support content that may be presented within a user interface view have been described herein. It will be recognized that the customer support content may include additional or additional types of content as may serve a particular implementation. For example, FIG. 7 shows user interface view 300 and is similar to FIG. 4, except that customer support content instance 402-1 includes a selectable option 702-1 and customer support content instance 402-2 includes a selectable option 702-2. Selectable option 702-1 may be selected by the user to access an interactive tutorial that describes how to record the media program that is being presented. Selectable option 702-2 may be selected by the user to access additional information related to the quick tray 302. In some examples, the additional information may be presented within a separate customer support portal that may be displayed within the display screen in place of user interface view 300. Alternatively, the additional information may be presented within user interface view 300.

Figure 8:
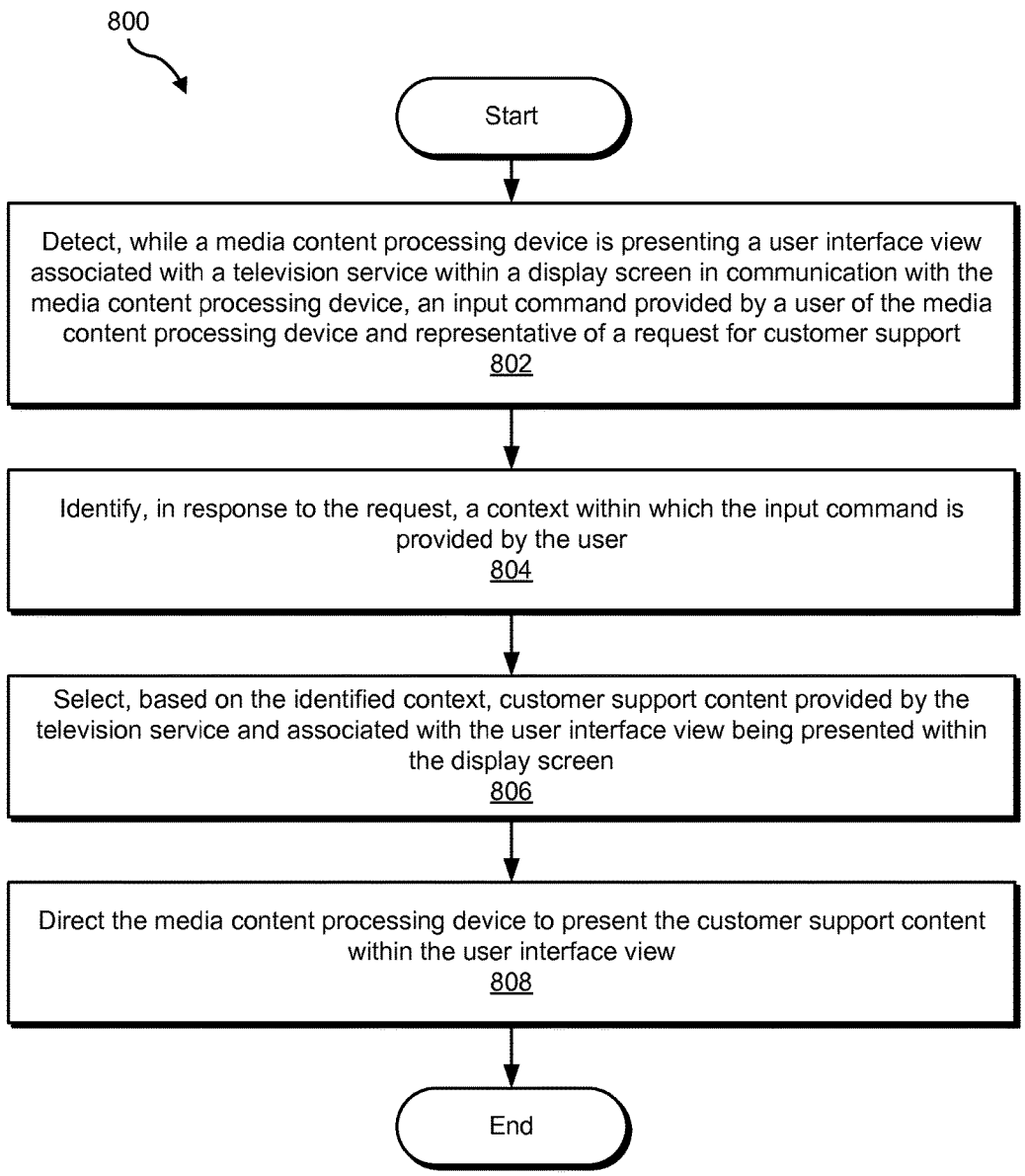
FIG. 8 illustrates an exemplary method of providing context-based customer support for a user interface view associated with a television service according to principles described herein.

FIG. 8 illustrates an exemplary method 800 of providing context-based customer support for a user interface view associated with a television service. While FIG. 8 illustrates exemplary steps according to one embodiment, other embodiments may omit, add to, reorder, and/or modify any of the steps shown in FIG. 8. One or more of the steps shown in FIG. 8 may be performed by system 100 and/or any implementation thereof.

In step 802, a computer-implemented television service system detects, while a media content processing device is presenting a user interface view associated with a television service within a display screen in communication with the media content processing device, an input command provided by a user of the media content processing device and representative of a request for customer support. Step 802 may be performed in any of the ways described herein.

In step 804, the computer-implemented television service system identifies, in response to the request, a context within which the input command is provided by the user. Step 804 may be performed in any of the ways described herein.

In step 806, the computer-implemented television service system selects, based on the identified context, customer support content provided by the television service and associated with the user interface view being presented within the display screen. Step 806 may be performed in any of the ways described herein.

In step 808, the computer-implemented television service system directs the media content processing device to present the customer support content within the user interface view. Step 808 may be performed in any of the ways described herein.

Figure 9:
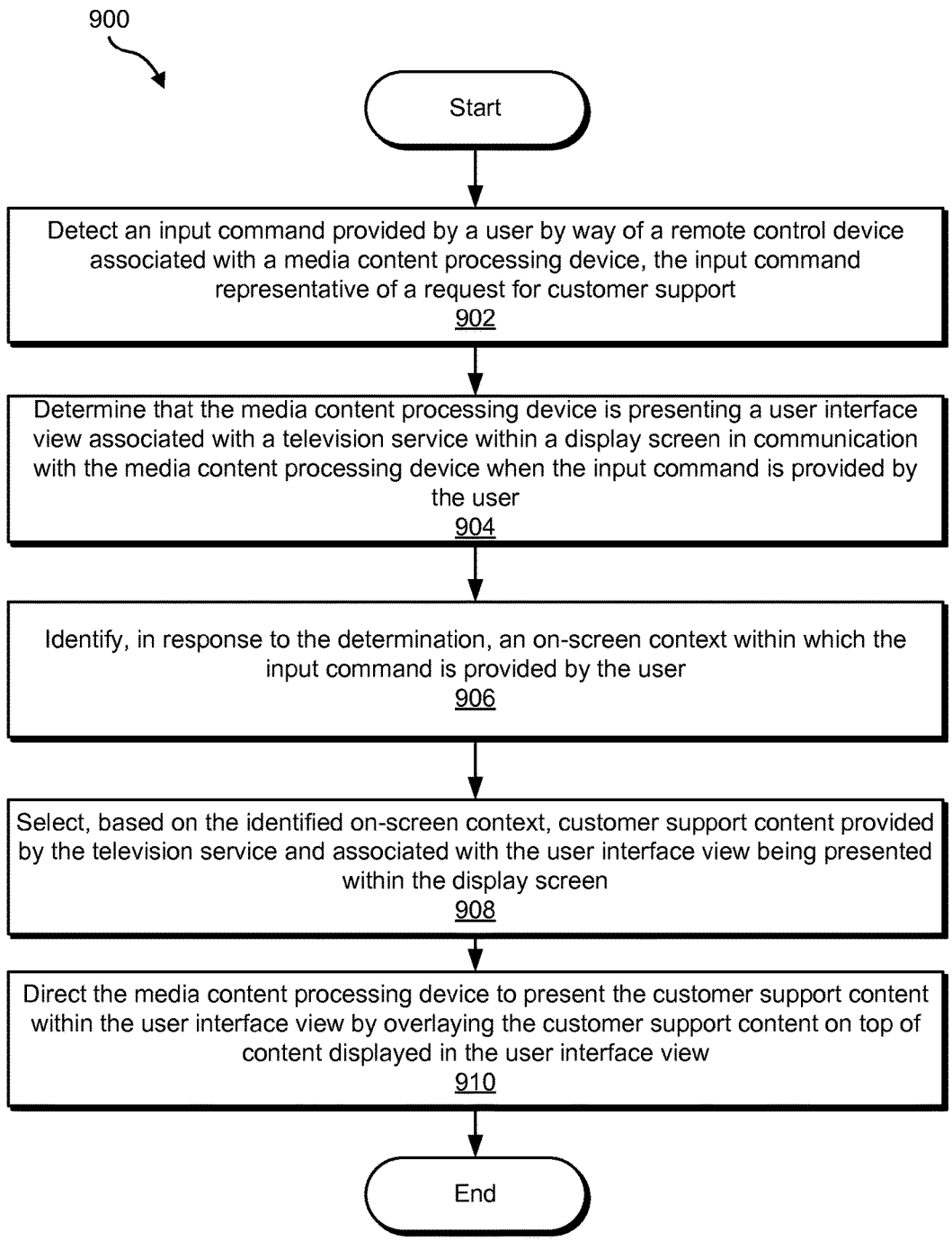
FIG. 9 illustrates another exemplary method of providing context-based customer support for a user interface view associated with a television service according to principles described herein.

FIG. 9 illustrates another exemplary method 900 of providing context-based customer support for a user interface view associated with a television service. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a computer-implemented television service system detects an input command provided by a user by way of a remote control device associated with a media content processing device, the input command representative of a request for customer support. Step 902 may be performed in any of the ways described herein.

In step 904, the computer-implemented television service system determines that the media content processing device is presenting a user interface view associated with a television service within a display screen in communication with the media content processing device when the input command is provided by the user. Step 904 may be performed in any of the ways described herein.

In step 906, the computer-implemented television service system identifies, in response to the determination in step 904, an on-screen context within which the input command is provided by the user. Step 906 may be performed in any of the ways described herein.

In step 908, the computer-implemented television service system selects, based on the identified on-screen context, customer support content provided by the television service and associated with the user interface view being presented within the display screen. Step 908 may be performed in any of the ways described herein.

In step 910, the computer-implemented television service system directs the media content processing device to present the customer support content within the user interface view by overlaying the customer support content on top of content displayed in the user interface view. Step 910 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
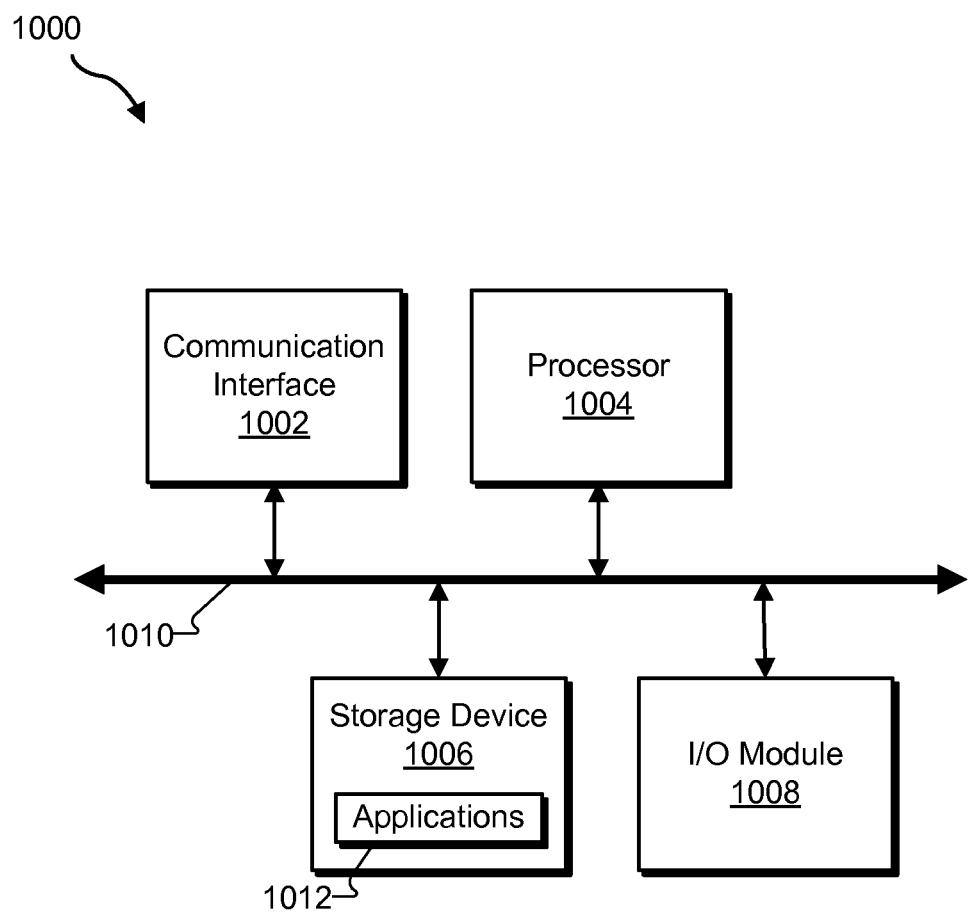
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with detection facility 102 and content management facility 104. Likewise, storage facility 106 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a computer-implemented television service system while a media content processing device is presenting a user interface view associated with a television service within a display screen in communication with the media content processing device, an input command provided by a user of the media content processing device and representative of a request for customer support;
   identifying, by the computer-implemented television service system in response to the request, a context within which the input command is provided by the user, the identified context comprising a temporal context that indicates a time of day that the input command is provided by the user and an on-screen context in which a media program is presented in the user interface view concurrently with a quick tray that includes a set of selectable graphical objects that comprises a single row of a plurality of graphical objects representing individual media programs each having a different source included in a plurality of sources, the plurality of graphical objects in the single row being presented in the user interface view together with a plurality of badges that indicate the plurality of sources of the individual media programs represented by the plurality of graphical objects;
   determining, by the computer-implemented television service system based on the identified context, that the time of day that the input command is provided by the user corresponds to a time of day that the user typically consumes the media program;
   selecting, by the computer-implemented television service system based on the identified context, customer support content that is provided by the television service and that includes information describing how to utilize a feature represented in the user interface view being presented within the display screen, the customer support content comprising an in-depth version and a concise version that includes less content than the in-depth version of the customer support content; and
   directing, by the computer-implemented television service system based on the determining that the time of day that the input command is provided by the user corresponds to a time of day that the user typically consumes the media program, the media content processing device to present the concise version of the customer support content together with the quick tray including the set of selectable graphical objects within the user interface view instead of the in-depth version of the customer support content, wherein
   the concise version of the customer support content and the plurality of graphical objects representing the individual media programs in the single row in the quick tray are each overlaid on top of the media program that is presented in the user interface view, and
   the concise version of the customer support content is further provided together with information that describes a particular media program represented by a graphical object included in the set of selectable graphical objects within the user interface view.

2. The method of claim 1, wherein the detecting of the input command comprises detecting a selection by the user of a button of a remote control device associated with the media content processing device.

3. The method of claim 1, wherein the detecting of the input command comprises detecting a voice command provided by the user.

4. The method of claim 1, wherein:
   the selecting of the customer support content comprises selecting customer support content specifically related to content displayed within the user interface view.

5. The method of claim 1, wherein the temporal context further indicates at least one of a week day during which the input command is provided by the user and a calendar date during which the input command is provided by the user.

6. The method of claim 1, wherein the context within which the input command is provided by the user further comprises a user context that indicates an identity of the user.

7. The method of claim 6, wherein the selecting of the customer support content comprises:
   determining that the user has already accessed a first customer support content instance; and
   selecting a second customer support content instance different than the first customer support content instance for presentation to the user.

8. The method of claim 1, wherein the selecting of the customer support content comprises selecting customer support content specific to a graphical object included in the set of selectable graphical objects.

9. The method of claim 1, embodied as computer-executable instructions on at least one non-transitory computer-readable medium.

10. A method comprising:
    detecting, by a computer-implemented television service system, an input command provided by a user by way of a remote control device associated with a media content processing device, the input command representative of a request for customer support;
    determining, by the computer-implemented television service system, that the media content processing device is presenting a user interface view associated with a television service within a display screen in communication with the media content processing device when the input command is provided by the user;
    identifying, by the computer-implemented television service system in response to the determining, a temporal context that indicates a time of day that the input command is provided by the user and an on-screen context within which the input command is provided by the user, the identified on-screen context comprising a context in which a media program is presented in the user interface view concurrently with a quick tray that includes a set of selectable graphical objects that comprises a single row of a plurality of graphical objects representing individual media programs each having a different source included in a plurality of sources, the plurality of graphical objects in the single row being presented in the user interface view together with a plurality of badges that indicate the plurality of sources of the individual media programs represented by the plurality of graphical objects;

determining, by the computer-implemented television service system based on the identified temporal context, that the time of day that the input command is provided by the user corresponds to a time of day that the user typically consumes the media program;

selecting, by the computer-implemented television service system based on the identified on-screen context and the identified temporal context, customer support content that is provided by the television service and that includes information describing how to utilize a feature represented in the user interface view being presented within the display screen, the customer support content comprising an in-depth version and a concise version that includes less content than the in-depth version of the customer support content; and directing, by the computer-implemented television service system based on the determining that the time of day that the input command is provided by the user corresponds to a time of day that the user typically consumes the media program, the media content processing device to present the concise version of the customer support content together with the quick tray including the set of selectable graphical objects within the user interface view instead of the in-depth version of the customer support content, wherein the concise version of the customer support content and the plurality of graphical objects representing the individual media programs in the single row in the quick tray are each overlaid on top of the media program that is presented in the user interface view, and the concise version of the customer support content is further provided together with information that describes a particular media program represented by a graphical object included in the set of selectable graphical objects within the user interface view.

11. The method of claim 10, embodied as computer-executable instructions on at least one non-transitory computer-readable medium.

12. A system comprising:
at least one physical computing device that:
detects, while a media content processing device is presenting a user interface view associated with a television service within a display screen in communication with the media content processing device, an input command provided by a user of the media content processing device and representative of a request for customer support, identifies, in response to the request, a context within which the input command is provided by the user, the identified context comprising a temporal context that indicates a time of day that the input command is provided by the user and an on-screen context in which a media program is presented in the user interface view concurrently with a quick tray that includes a set of selectable graphical objects that comprises a single row of a plurality of graphical objects representing individual media programs each having a different source included in a plurality of sources, the plurality of graphical objects in the single row being presented in the user interface view together with a plurality of badges that indicate the plurality of sources of the individual media programs represented by the plurality of graphical objects, determines, based on the identified context, that the time of day that the input command is provided by the user corresponds to a time of day that the user typically consumes the media program, selects, based on the identified context, customer support content that is provided by the television service and that includes information describing how to utilize a feature represented in the user interface view being presented within the display screen, the customer support content comprising an in-depth version and a concise version that includes less content than the in-depth version of the customer support content, and directs, based on the determination that the time of day that the input command is provided by the user corresponds to a time of day that the user typically consumes the media program, the media content processing device to present the concise version of the customer support content together with the quick tray including the set of selectable graphical objects within the user interface view instead of the in-depth version of the customer support content, wherein the concise version of the customer support content and the plurality of graphical objects representing the individual media programs in the single row in the quick tray are each overlaid on top of the media program that is presented in the user interface view, and the concise version of the customer support content is further provided together with information that describes a particular media program represented by a graphical object included in the set of selectable graphical objects within the user interface view.

13. The system of claim 12, wherein the at least one physical computing device detects the input command by detecting at least one of a selection by the user of a button of a remote control device associated with the media content processing device and a voice command provided by the user.

14. The system of claim 12, wherein:
the selecting of the customer support content comprises selecting customer support content specifically related to content displayed within the user interface view.

15. The system of claim 12, wherein the temporal context further indicates at least one of a week day during which the input command is provided by the user and a calendar date during which the input command is provided by the user.

16. The system of claim 12, wherein the context within which the input command is provided by the user further comprises a user context that indicates an identity of the user.

17. The system of claim 12, wherein the selecting of the customer support content comprises selecting customer support content specific to a graphical object included in the set of selectable graphical objects.

* * * * *